United States Patent

Tschopp

[11] Patent Number: 4,743,683
[45] Date of Patent: May 10, 1988

[54] IMIDAZOLE AZO DYES

[75] Inventor: Paul Tschopp, Düdingen, Switzerland

[73] Assignee: Ciba-Geigy AG, Basel, Switzerland

[21] Appl. No.: 938,986

[22] Filed: Dec. 3, 1986

Related U.S. Application Data

[62] Division of Ser. No. 757,550, Jul. 19, 1985, Pat. No. 4,661,437.

[30] Foreign Application Priority Data

Jul. 27, 1984 [CH] Switzerland ............... 3659/84

[51] Int. Cl.$^4$ .............. C07C 107/00; C09B 29/036; C09B 29/09; C09B 29/24
[52] U.S. Cl. .............. 534/753; 534/581; 534/582; 534/650; 534/787; 534/788; 534/791; 534/792; 534/794; 534/795; 534/887
[58] Field of Search ............. 534/787, 650, 753, 794

[56] References Cited

U.S. PATENT DOCUMENTS

| | | | |
|---|---|---|---|
| 2,883,373 | 4/1959 | Bossard et al. | 534/787 X |
| 3,121,710 | 2/1964 | Sureau et al. | 534/787 X |
| 3,200,108 | 8/1965 | Kremer et al. | 534/787 X |
| 3,379,714 | 4/1968 | Alicot et al. | 534/787 X |
| 3,697,501 | 10/1972 | Dehnert | 534/787 X |
| 3,826,800 | 7/1974 | Dehnert et al. | 534/787 X |
| 3,985,726 | 10/1976 | Artz | 534/787 X |
| 4,097,475 | 6/1978 | James | 534/753 |
| 4,313,731 | 2/1982 | Imahori et al. | 534/753 X |
| 4,396,710 | 8/1983 | Bergthaller et al. | 430/562 |
| 4,456,668 | 6/1984 | Lenoir et al. | 430/17 |
| 4,524,123 | 6/1985 | Schenk et al. | 430/241 |
| 4,600,681 | 7/1986 | Bergthaller et al. | 534/753 X |

FOREIGN PATENT DOCUMENTS

| | | | |
|---|---|---|---|
| 55-71754 | 5/1980 | Japan | 534/753 |
| 55-94959 | 7/1980 | Japan | 534/753 |
| 57-67662 | 4/1982 | Japan | 534/753 |
| 57-109859 | 7/1982 | Japan | 534/753 |
| 7100628 | 7/1971 | Netherlands | 534/787 |

Primary Examiner—Floyd D. Higel
Attorney, Agent, or Firm—Wenderoth, Lind & Ponack

[57] ABSTRACT

A photographic recording material which contains at least one dye of the formula

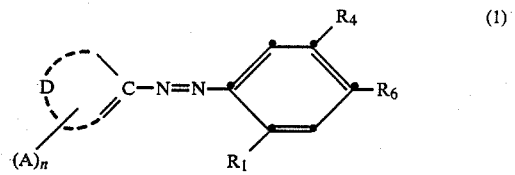

wherein D is the group of atoms necessary to complete a 5-membered ring that contains at least one nitrogen atom, A is hydrogen, alkyl, alkoxy, phenyl, alkylthio, cyano, nitro or halogen, n is 0 to 3, $R_1$ is hydrogen, alkyl, hydroxyl, acylamino, $R_6$ is hydrogen or unsubstituted or substituted amino, and $R_4$ is hydrogen or alkoxy. The material is distinguished by good color reproduction, brilliant colors and excellent lightfastness.

1 Claim, No Drawings

IMIDAZOLE AZO DYES

This application is a division of application Ser. No. 757,550, filed July 19, 1985, now U.S. Pat. No. 4,661,437.

The present invention relates to a photographic recording material for the silver dye bleach process.

The use of water-soluble polyazo or azoxy dyes for the silver dye bleach process is described for example by A. Meyer, J. Phot. Sci. 13, (1965), 90, and in Research Disclosure 17643/VII A, December 1978. The use of such azo dyes affords advantages initially to the extent that it is possible to obtain an easy and homogeneous coloration of the hydrophilic colloidal binders of a photographic layer, especially gelatin. When processing exposed silver dye bleach materials, water-soluble fission products of the azo dyes also form at the exposed areas and can be easily washed out. However, among the disadvantages that arise when using azo dyes, particular mention is to be made of the tendency of these dyes to diffuse in and between photographic layers. The use of reactive dyes has been proposed to overcome this shortcoming. However, the use of reactive dyes entails too strong an influence on the rheological, chemical and mechanical properties of the photographic layer to be prepared. Not even the use of higher molecular weight water-soluble azo dyes affords any completely satisfactory result. Although the diffusion resistance is increased, these dyes have a propensity to form associates, thereby causing a change in the spectral properties such as the absorption maximum and the maximum density.

In Swiss patent specification No. 600 385, it has furthermore been proposed to use water-insoluble azo dyes (oil-soluble dyes, i.e. soluble in high boiling organic solvents) in silver dye bleach materials. However, these dyes bleach only very slowly and incompletely. In addition, a special treatment of the photographic material in a strongly alkaline medium is required to produce the desired image dye. Other water-insoluble azo dyes which have been incorporated in silver dye bleach materials (q.v. for example U.S. Pat. No. 3,544,326 and Research Disclosure 14983, September 1976) are very difficult to obtain and their stability to changes in the pH values and the action of light is too low.

It is therefore the object of the present invention to provide novel improved oil-soluble recording materials for the silver dye bleach process that contain azo dyes.

Oil-soluble azo dyes for use in photographic silver dye bleach materials have now been found, which dyes substantially impart the desired properties and yield photographic images of high quality.

Accordingly, the present invention relates to a photographic recording material for the silver dye bleach process, which material contains in at least one silver halide emulsion layer, or in a colloidal layer adjacent to said layer or layers, at least one oil-soluble azo dye of the formula

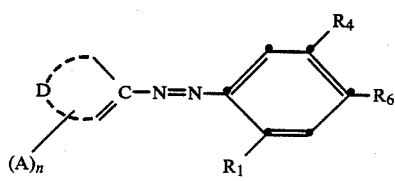

(1)

wherein
D is the group of atoms necessary to complete a 5-membered ring which contains at least one nitrogen atom and which may be fused with a benzene ring,
A is hydrogen, $C_1$-$C_{12}$alkyl, $C_1$-$C_4$alkyl which is substituted by alkoxy, phenoxy, acyl, acyloxy, carbalkoxy, cyano or halogen, or is $C_1$-$C_4$alkoxy, phenyl, phenyl which is substituted by an electronegative group, $C_1$-$C_4$alkylthio, phenyl-substituted $C_1$-$C_4$alkylthio, cyano, nitro or halogen, and n is 0, 1, 2 or 3,
$R_1$ is hydrogen, $C_1$-$C_4$alkyl, hydroxyl, —NHCOL$_1$ or —NHP(O)(L$_2$)$_2$, wherein L$_1$ is $C_1$-$C_{20}$alkyl or substituted carbamoyl, and L$_2$ is alkoxy or alkoxyalkoxy containing 1 to 8 carbon atoms in each moiety, with the proviso that $R_1$ is only —NHP(O)(L$_2$)$_2$ if A is nitro-substituted phenyl,
$R_6$ is hydrogen or —NR$_2$R$_3$, wherein each of $R_2$ and $R_3$ independently of the other is hydrogen, $C_1$-$C_8$alkyl or $C_1$-$C_4$alkyl which is substituted by acylamino, phenyl, alkoxy or hydroxyl, and
$R_4$ is hydrogen, $C_1$-$C_4$alkoxy or —(OCH$_2$CH$_2$)$_m$—OCH$_3$, wherein m is 1 or 2.

The invention further relates to those dyes of formula (1), wherein D is the group of atoms that completes a benzpyrazole radical.

In the azo dyes of formula (1), D is the group of atoms necessary to complete a 5-membered ring which may be fused with a benzene ring and which contains at least one nitrogen atom. This ring may contain further hetero atoms, for example nitrogen and sulfur atoms. Examples of suitable heterocyclic rings are accordingly pyrazolyl, imidazolyl, triazolyl, thiazolyl, thiadiazolyl and isothiadiazolyl rings and the derivatives thereof which are fused with a benzene ring.

These rings may be present in the dyes of formula (1) unsubstituted as well as substituted. The substituent A may suitably be for example $C_1$-$C_{12}$alkyl such as methyl, ethyl, propyl, butyl, pentyl, hexyl, heptyl, octyl, nonyl, decyl, undecyl and dodecyl, as well as the corresponding branched isomers. Preferred alkyl radicals are methyl, ethyl, propyl, isopropyl, butyl, decyl, undecyl and dodecyl. The $C_1$-$C_4$alkyl radicals in particular may be substituted. Examples of suitable alkyl substituents are alkoxy, preferably $C_1$-$C_4$alkoxy such as ethoxy, phenoxy, acyl, for example acetyl or benzoyl, acyloxy, for example pivaloyloxy, carbalkoxy, preferably $C_2$-$C_8$carbalkoxy such as —CO$_2$C$_2$H$_5$ and —CO$_2$CH$_2$C$_6$H$_5$, and cyano or halogen, preferably chlorine.

Further substituents A at the heterocyclic rings D are $C_1$-$C_4$alkoxy, preferably ethoxy, also phenyl which may be substituted by an electronegative group such as nitro; $C_1$-$C_4$alkylthio, preferably methylthio, phenyl-substituted $C_1$-$C_4$alkylthio such as benzylthio; and cyano, nitro or halogen, preferably chlorine.

The heterocyclic rings D may carry up to 3 substituents A, i.e. n is 0, 1, 2 or 3.

In addition to being hydrogen and hydroxyl, the substituent $R_1$ at the coupling component denotes $C_1$-$C_4$alkyl, preferably methyl. $R_1$ also denotes radicals of the formulae —NHCOL$_1$ and —NHP(O)(L$_2$)$_2$. L$_1$ is $C_1$-$C_{20}$alkyl or substituted carbamoyl (—CON(substituent)$_2$). Suitable alkyl radicals L$_1$ are the radicals cited for A, as well as e.g. n-tridecyl, n-heptadecyl, n-octadecyl and n-eicosyl and also corresponding branched radicals. Suitable substituents of the carbamoyl group are, in particular, methyl and phenyl. $L_2$ is alkoxy or alkoxyalkoxy containing 1 to 8 carbon atoms in each moiety. Preferred examples of such groups are methoxy, ethoxy, butoxy, hexyloxy and octyloxy, as well as e.g. radicals of the formula —$OC_2H_4$—$OC_2H_5$.

The substituent $R_2$ is hydrogen or an unsubstituted or substituted amino group of the formula —$NR_2R_3$, wherein $R_2$ and $R_3$ are each independently of the other hydrogen or $C_1$–$C_4$alkyl, for example methyl, ethyl, propyl, isopropyl, butyl, hexyl and octyl. The $C_1$–$C_4$alkyl radicals in particular may be substituted. Examples of possible substituents are phenyl, hydroxyl, alkoxy, preferably $C_1$–$C_4$alkoxy, for example methoxy and butoxy, as well as acylamino of the formula —$NHCOL_3$, wherein $L_3$ is alkyl of preferably 4 to 12 carbon atoms, most preferably tert-butyl, heptyl, octyl, nonyl, decyl, undecyl or dodecyl.

In addition to being hydrogen, $R_4$ is $C_1$–$C_4$alkoxy, preferably methoxy, or an alkoxyalkoxy radical of the formula —$(OCH_2CH_2)_m$—$OCH_3$, wherein m is 1 or, preferably, 2.

Preferred dyes of formula (1) are those wherein the ring formed by D is a 1-phenyl-3-methylpyrazolyl radical. Particularly preferred are those 1-phenyl-3-methylpyrazole-azo dyes in whose coupling component $R_1$ is hydrogen or $C_1$–$C_4$alkyl and $R_6$ and is —$NR_2R_3$, wherein each of $R_2$ and $R_3$ independently of the other is $C_1$–$C_4$alkyl or $(CH_2)_pNHCOL_3$, wherein $L_3$ is $C_4$–$C_{12}$alkyl, p is 1, 2, 3 or 4 and $R_4$ is hydrogen.

In a further group of suitable dyes of formula (1), D completes a benzpyrazolyl or 1-methylbenzpyrazolyl radical. Such dyes are particularly suitable when $R_1$ in the coupling component is hydrogen or —$NHCOL_1$, wherein $L_1$ is $C_6$–$C_{12}$alkyl, $R_6$ is —$NR_2R_3$, wherein each of $R_2$ and $R_3$ independently of the other is $C_1$–$C_4$alkyl or phenyl-substituted $C_1$–$C_4$alkyl, and $R_4$ is hydrogen.

Dyes in which D forms a ring of the formula

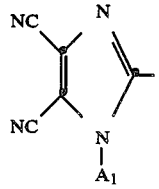

wherein $A_1$ is hydrogen, $C_1$–$C_4$alkyl or $C_1$–$C_4$alkyl which is substituted by $C_1$–$C_4$alkoxy, phenoxy, $C_2$–$C_8$-carbalkoxy, acetyl, benzoyl or cyano, are likewise very suitable for use in silver dye bleach materials. Such dyes are particularly suitable when $R_1$ in the coupling component is —$NHCOL_1$ or —$NHP(O)(L_2)_2$, wherein $L_1$ is $C_1$–$C_{14}$alkyl or N-methyl-N-phenylcarbamoyl, and $L_2$ is $C_1$–$C_4$alkoxy, with the proviso that $R_1$ is only —$NHP(O)(L_2)_2$ if $A_1$ is nitro-substituted phenyl, $R_6$ is —$NR_2R_3$, wherein each of $R_2$ and $R_3$ independently of the other is hydrogen, $C_1$–$C_8$alkyl, or phenyl- or methoxy-substituted $C_1$–$C_4$alkyl, and $R_4$ is hydrogen or methoxy.

Further preferred dyes of formula (1) contain, as ring D, a 1,2,4-triazolyl radical which may be substituted in the 1-position by decyl. In the coupling component of the particularly preferred dyes of this class, $R_1$ and $R_4$ are hydrogen and $R_6$ is —$NR_2R_3$, wherein each of $R_2$ and $R_3$ independently of the other is $C_1$–$C_4$alkyl which may be substituted by phenyl.

Preferred sulfur-containing heterocyclic rings D are those of the formulae

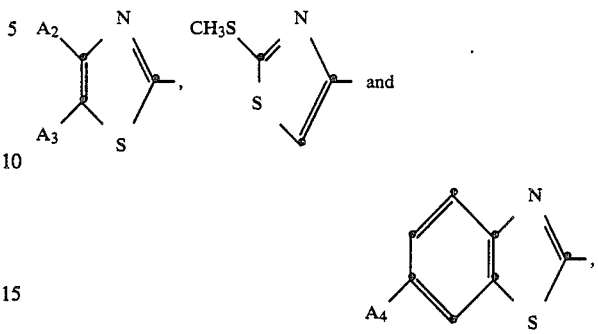

wherein each of $A_2$ and $A_3$ independently of the other is hydrogen, nitro or p-nitrophenyl, and $A_4$ is hydrogen or $C_2$–$C_4$alkoxy. Dyes of formula (1) containing such heterocyclic rings are preferred when $R_1$ in the coupling component is hydrogen, $C_5$–$C_{10}$alkyl, —$NHCOL_1$, wherein $L_1$ is $C_1$–$C_{20}$alkyl, $R_6$ is hydrogen or —$NR_2R_3$, wherein each of $R_2$ and $R_3$ independently of the other is hydrogen, $C_1$–$C_4$alkyl, $(CH_2)_pNHCOL_3$, wherein $L_3$ is $C_1$–$C_4$alkyl, p is 1, 2, 3 or 4, or is benzyl, and $R_4$ is hydrogen, methoxy or —$(OCH_2CH_2)_2OCH_3$.

A further group of suitable heterocyclic rings D corresponds to the formulae

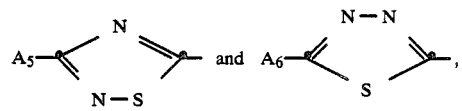

wherein $A_5$ is phenyl, chlorine, trichloromethane or benzylthio, and $A_6$ is phenyl or $C_1$–$C_{12}$alkyl. In conjunction with coupling components in which $R_1$ is hydrogen, —$NHCOL_1$, wherein $L_1$ is $C_1$–$C_{20}$alkyl, and $R_6$ is —$NR_2R_3$, wherein each $R_2$ and $R_3$ independently of the other is hydrogen, $C_1$–$C_6$alkyl, or $C_1$–$C_4$alkyl which is substituted by methoxy, hydroxyl or phenyl, and $R_4$ is hydrogen or methoxy, these heterocyclic rings constitute dyes of formula (1) which are very suitable for use in silver dye bleach materials.

The present invention further relates to those compounds of formula (1), wherein D is the grpoup of atoms necessary to complete the radical of the formula

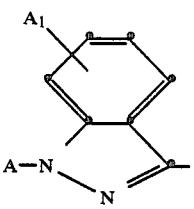

wherein each of A and $A_1$ independently of the other is hydrogen or $C_1$–$C_4$alkyl, or nitro-substituted phenyl, $R_1$ is hydrogen, —$NHCOL_1$, wherein $L_1$ is $C_6$–$C_{12}$alkyl or —$NHP(O)(L_2)_2$, wherein $L_2$ is alkoxy or alkoxyalkoxy containing 1 to 8 carbon atoms in each moiety, with the proviso that $R_1$ is —$NHP(O)(L_2)_2$ only if A or $A_1$ is nitro-substituted phenyl, $R_6$ is —$NR_2R_3$, wherein each of $R_2$ and $R_3$ independently of the other is $C_1$–$C_4$alkyl or $C_1$–$C_4$phenylalkyl, and $R_4$ is hydrogen or $C_1$–$C_4$alkoxy.

In these compounds, each of A and $A_1$ independently of the other is preferably hydrogen, methyl or 4-nitrophenyl, $R_1$ is hydrogen or —NHCOL$_1$, wherein $L_1$ is preferably $C_6$–$C_9$alkyl, $R_6$ is —NR$_2$R$_3$, wherein each of $R_2$ and $R_3$ independently of the other is methyl, ethyl, benzyl or phenylethyl, and $R_4$ is hydrogen or methoxy.

The compounds of formulae (301) to (320) constitute a further object of the invention.

The photoographic silver dye bleach materials of the present invention which contain the azo dyes of formula (1) have a number of advantages. As the dyes of formula (1) are dissolved in stable oil emulsions, they are unable to exert any undesired photographic effect on the silver halide crystals. The absorption spectra are substantially constant and are not dependent on the nature of the treatment in photographic processing baths. The high boiling organic solvent acts not only as solvent for the dyes but can simultaneously be the plasticiser for the gelatin. In addition, the recording materials of this invention have excellent resistance to light and heat.

The azo dyes of formula (1) employed in the practice of this invention are prepared in accordance with conventional methods, for example as described in German Offenlegungsschrift specifications Nos. 2 509 560, 2 514 581, 2 840 991, U.S. Pat. No. 4,028,323, and Swiss patent specifications Nos. 589 697 andd 595 420, by diazotising or nitrosating an amine of formula

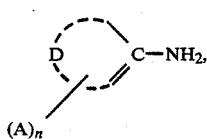

(2)

wherein D, A and n have the meanings assigned to them, and coupling the resultant intermediate with a compound of formula

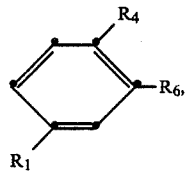

(3)

wherein $R_1$, $R_6$ and $R_4$ have the meanings assigned to them, in aqueous medium.

In the recording material of this invention, a transparent, metallic-reflecting or, preferably, white opaque material may be used as support, which material is preferably not able to absorb any liquid from the baths.

The support may consist, for example, of unpigmented or pigmented cellulose triacetate or polyester. If the support consists of paper fibres, it must be varnished on both sides or coated with polyethylene. The light-sensitive layers are present on at least one side of this support, preferably in the known arrangement, i.e. a bottom red-sensitised silver halide emulsion layer which contains a cyan azo dye, e.g. of formula (1), on top of this layer a green-sensitised silver halide emulsion layer which contains a magenta azo dye, e.g. if formula (1), and a topmost blue-sensitive silver halide emulsion layer which contains a yellow azo dye, e.g. of formula (1).

The material may also contain base layers, intermediate layers, filter layers and protective layers, but the total thickness of the layers should normally not exceed 20 μm.

The dyes of formula (1) employed in the practice of this invention are lipophilic and are normally incorporated into the gelatin as solutions in high boiling solvents. Usually it is sufficient to add the dyes in the form of a solution in a solvent, with or without the addition of a readily volatile auxiliary solvent, at normal or slightly elevated temperature, to an aqueous solution of gelatin, with efficient stirring. Instead of simple stirring, it is also possible to use the conventional methods of dispersing by means of kneading forces and/or shear forces or by ultrasonics. The mixture is then brought together with a gelatin containing silver halide and/or other materials for producing photographic images, coated on a support in conventional manner to form a layer and dried, if appropriate.

It is also possible to add the dye in solid form as a fine suspension. It is further possible to incorporate the dyes into the gelatin in the presence of high molecular polymers. Latices are particularly useful for this application.

The casting solution may contain additional assistants such as hardeners, wetting agents, as well as spectral sensitisers and stabilisers for the silver halide.

The azo dyes of formula (1) do not undergo any chemical reactions with the light-sensitive materials. The dyes are very resistant to diffusion because they form stable organic solutions. They are insensitive to calcium ions and can be readily bleached. Further, when added to coating solutions, they effect neither an increase in viscosity nor a substantial change in viscosity when the coating mixture stands.

The spectral absorption values in gelatin are such that, depending on their structure, the dyes of formula (1) can be combined to a dye tripack comprising one yellow, one magenta and one cyan dye, and which exhibits grey shades which appear neutral to the eye over the entire density range.

The photographic silver dye bleach material prepared from one or more azo dyes of formula (1) is distinguished in particular by brilliant colours, good colour reproduction and excellent light-fastness.

The processing of the exposed and developed silver dye bleach materials is carried out in conventional manner and comprises the steps of dye bleaching, silver bleach and fixing and subsequent washings, if appropriate also between the individual steps. The dye bleaching and silver bleaching, and optionally also fixing, can be combined in a single treatment step.

For silver development, baths of different composition may be used, for example those containing hydroquinone as developed substance, or additionally a 1-phenyl-3-pyrazolidinone. One liter of development bath should contain, for example, from 0.3 to 60 millimoles of sodium thiosulofate; however, the optimum amount may vary within the indicated limits, depending on the nature of the material, the temperature of the development bath and the desired duration of treatment. It is also possible to incorporate developer compounds or development precursors into the photographic material, while ensuring by suitable buffering that these substances remain inactive in the dry layer during storage. In this case, only an activator bath with a high pH value and which may be free from developer substances is required for initiating the development.

As dye bleaching baths—if the dye bleaching is carried out as a separate treatment step—it is preferred to use those containing a dye bleach catalyst in addition to a strong acid, a water-soluble iodide and an antioxidant.

Combined dye and silver bleaching baths, which are preferred, normally contain a water-soluble oxidising agent in addition to the indicated components. Suitable dye bleach catalysts are, in particular, diazine compounds, for example those employed in German Offenlegungsschrift 2 010 280.

The term "strong acids" employed herein will be understood as meaning those which impart a pH value of at most 2 to the combined dye and silver bleaching bath, i.e. for example hydrochloric acid, phosphoric acid and, preferably, sulfuric acid, p-toluenesulfonic acid, or sulfamic acid.

As water-soluble iodide it is possible to use an alkali metal iodide, for example potassium iodide or sodium iodide.

Suitable oxidising agents are nitroso compounds, for example p-nitrosodimethylaniline, nitro compounds such as aromatic nitro compounds and, preferably, aromatic or mono- or dinitrobenzenesulfonic acids, for example m-nitrobenzenesulfonic acid.

The antioxidant employed is a reductone or a water-soluble mercapto compound, or also a tertiary water-soluble phosphine. The last mentioned compound is also effective as bleaching catalyst (q.v. German Offenlegungsschrift 2 651 969). Suitable reductones are in particular aci-reductones containing a 3-carbonylene-1,2-diol group, for example reductinic acid, triosereductone or, preferably, ascorbic acid.

Suitable mercapto compounds are those of the formula $HSA(B)_m$, wherein A is an aliphatic, cycloaliphatic, araliphatic, aromatic or heterocyclic bridge member, B is a water-solubilising radical and m is an integer of not more than 4 (q.v. German Offenlegungsschrift specifications Nos. 2 258 076 and 2 423 819).

Thiolactones, for example those described in German Offenlegungsschrift No. 3 045 059, are also suitable antioxidants.

The fixing bath can be made up in known and conventional manner. A suitable fixing agent is for example sodium thiosulfate or, preferably, ammonium thiosulfate, if desired with further components such as sodium bisulfite, sodium metabisulfite and/or ammonium bisulfate, and, if desired, a sequestering agent such as ethylene-diaminete-traacetic acid.

The treatment baths may contain further conventional assistants, for example hardeners, wetting agents, fluorescent whitening agents or UV stabilisers.

SYNTHESIS EXAMPLES

EXAMPLE 1

Dye of the formula

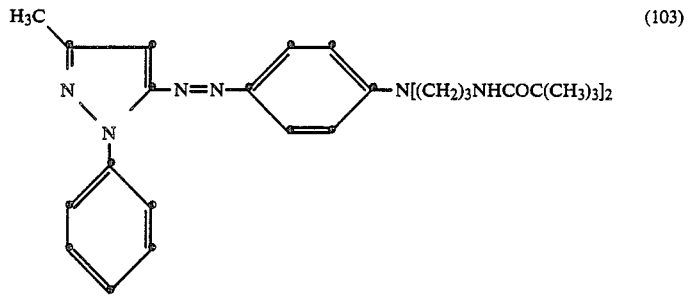

(103)

With stirring, 53 g of pivaloyl chloride are added dropwise at about 10° C. to a solution of 41.5 g of N,N-bis(3-aminopropyl)aniline and 45 g of triethylamine in 150 ml of acetonitrile, and the mixture is then allowed to react for about 6 hours at room temperature. The reaction mixture is diluted with water, filtered with suction, and the filter cake is washed repeatedly with water and vacuum dried to constant weight, affording 48 g of N,N-bis(3-pivaloylaminopropyl)aniline with a melting point of 72° C.

With stirring, a solution of 0.4 g of sodium nitrite in 3 ml of water is added at −10° to −5° C. to a solution of 1 g of 5-amino-3-methyl-1-phenylpyrazole in 30 ml of water and 15 ml of concentrated hydrochloric acid (37%). The mixture is allowed to react until the nitrite reaction has ceased. The reaction solution is then added to a solution of 2.2 g of the above prepared coupling component in 25 ml of glacial acetic acid and the mixture is allowed to react for about 3 hours. After buffering with sodium acetate, the precipitated oil is extracted with methylene chloride and the extract is purified by chromatography over silica gel (eluant: 19:1 mixture of chloroform/isopropanol), affording 0.9 g of the compound of formula (103).

EXAMPLE 2

Dye of the formula

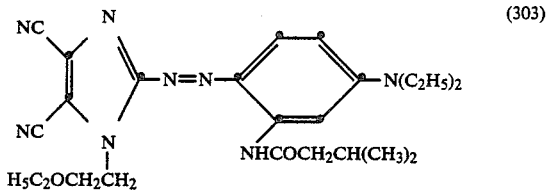

(303)

With efficient stirring, a solution of 1.4 g of sodium nitrite in 20 ml of water is added at 20°-25° C. to a solution of 2.7 g of 2-aminio-4,5-dicyanoimidazole in 140 ml of concentrated hydrochloric acid. After 30 minutes, excess nitrite is destroyed with sulfamic acid. The diazo solution is then added to a solution of 4.4 g of N,N-diethyl-3-isovalerylaminoaniline in 1150 ml of methanol and the pH is adjusted to 5.5 with a 50% aqueous solution of sodium acetate. After 2 hours the precipitate is filtered with suction and the filter residue is washed with water and vacuum dried. Yield: 7.3 g.

1.0 g of the above intermediate together with 0.61 g of 2-ethoxyethyltoluenesulfonate (prepared in accordance with J. Chem. Soc. 1957, 2931) and 0.30 g of N-ethyl diisopropylamine are heated for 14 hours at 80° C. in 20 ml of anhydrous toluene. The reaction mixture is filtered and the filtrate is concentrated by evaporation. The residue is purified by chromatography over silica gel (eluant: 19:1 mixture of chloroform/methanol), affording 0.8 g of the dye of the formula (303).

EXAMPLE 3

Dye of the formula

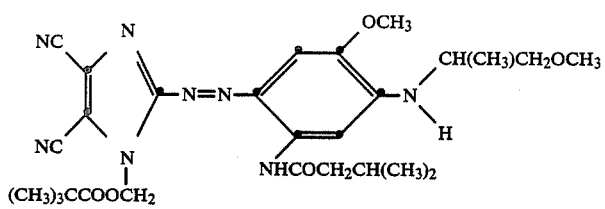

(311)

56.4 of 2-methoxy-5-propionylaminoaniline and 37 g of methoxyacetone are reduced with hydrogen at 60° C./0.94 bar in 200 ml of methyl cellosolve in the presence of 0.6 g of concentrated sulfuric acid (96%) and 1.9 g of platinum. When the uptake of hydrogen has ceased, the reaction mixture is filtered and the solvent is removed by vacuum distillation. The residue is then kept is then kept in 350 ml of 6% hydrochloric acid for 10 hours at 80° C. The pH is then adjusted to about 8 with sodium hydroxide solution and the precipitated oil is extracted with ethyl acetate. The solution so obtained is dried over magnesium sulfate, filtered and concentrated by evaporation in vacuo.

With efficient stirring, 12 g of isovaleryl chloride are added at about 10° C. to a solution of 20 g of this residue and 20 g of triethylamine in 50 ml of acetonitrile and the mixture is reacted for 5 hours. Precepitated triethylammonium chloride is removed by filtration and filtrate is concentrated by evaporation. The residue is dissolved in 250 ml of 7% hydrochloric acid and purified by fractional crystallisation with sodium carbonate and extraction with chloroform.

With efficient stirring, a solution of 0.6 g of sodium nitrite in 10 ml of water is added dropwise at 20°–25° C. to a solution of 1.1 g of 2-amino-4,5-dicyanoimidazole in 50 ml of concentrated hydrochloric acid. After 30 minutes, excess nitrite is destroyed with sulfamic acid. The diazo solution is then added to a solution of 2.4 g of the coupling component prepared as described above in 30 ml of glacial acetic. The pH is adjusted to 5 with a 50% aqueous solution of sodium acetate and the mixture is allowed to react for 1 hour at 20°–25° C. The product is extracted with methylene chloride and the resultant solution is concentrated by evaporation in vacuo.

0.66 g of the residue together with 0.45 g of bromacetone and 0.185 g of anhydrous potassium carbonate are heated for 20 hours at 80° C. in a mixture of 20 ml of toluene and 5 ml of dimethylformamide. The mixture is then filtered, the filtrate is concentrated, and the residue is chromatographed over silica gel (eluant: 11.9 mixture of hexane/dioxane), affording 0.4 g of the dye of formula (311).

EXAMPLE 4

Dye of the formula

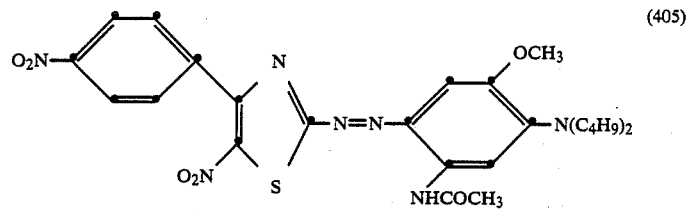

(405)

30 g of 2-amino-4-(4'-nitrophenyl)-1,3-thiazole (prepared in accordance with J. Chem. Soc. 1059, (2365) and 100 ml of acetic anhydride are heated for 3 hours at 140° C. Excess acetic anhydride is removed by vacuum distillation and the residue is treated with 500 ml of warm water, filtered, washed, and dried to constant weight, affording 34 g of 2-acetamido-4-(4'-nitrophenyl)-1,3-thiazole.

With efficient stirring, 7.7 g of 98% nitric acid are added at 0°–5° C. to a suspension of 30 g of the above compound in 150 ml of concentrated sulfuric acid and the mixture is allowed to react for 25 hours at this temperature. The reaction mixture is then poured on ice and filtered. The residue is thoroughly washed with water and then hydrolysed for 6 hours at 95° C. in a mixture of 100 ml of concentrated hydrochloric acid, 200 ml of glacial acetic acid and 200 ml of water. The pH is cautiously adjusted to 8 with potassium hydroxide solution, the mixture is filtered and the filter residue is dried to constant weight, affording 19 g of 2-amino-5-nitro-4-(4'-nitrophenyl)-1,3-thiazole.

With stirring, a solution of 0.16 g of sodium nitrite in 5 g of concentrated sulfuric acid is added at 0°–15° C. to a suspension of 0.52 g of 2-amino-5-nitro-4-(4'-nitrophenyl)-1,3-thiazole in a mixture of 25 ml of acetic acid and 3 ml of propionic acid. After a solution has formed, the reaction mixture is allowed to react for 1 hour. A solution of 0.84 g of di-(2-ethoxyethyl) N-(3-diethylamino-4-methoxyphenyl)phosphoramidate (prepared in accordance with European published patent specification 41 474) in 20 ml of methanol is added, the temperature is allowed to rise to 20° C., and a 50% aqueous solution of sodium acetate is added until the clear onset of dye formation. After 5 hours, the batch is diluted with water and filtered. The filter residue is vacuum dried and purified by chromatography over silica gel (eluant: 4:6 mixture of hexane/methyl ethyl ketone), affording 0.11 g of the dye of formula (405).

EXAMPLE 5

Dye of the formula

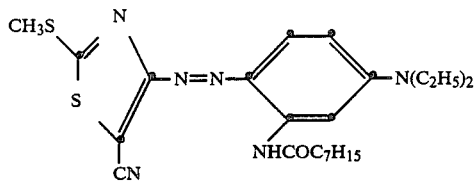

(501)

With efficient stirring, a solution of 0.6 g of sodium nitrite and 1.1 g of sodium hydrogen sulfate in 5 ml of concentrated sulfuric acid is added at −5° C. to a solution of 1.5 g of 4-amino-5-cyano-2-methylthio-1,3-thiazole (prepared in accordance with Tetrahedron 32, 1976, 613) in a mixture of 35 ml of acetic acid and 15 ml of propionic acid. After 3 hours, excess nitrite is destroyed with sulfamic acid, a solution of 1.1 g of N,N-diethyl-3-octoylamino-aniline in 10 ml of acetic acid is added, the temperature is raised to 20° C. and the mixture is stirred for 3 hours at this temperature.

The reaction mixture is added dropwise to about 200 g of ice and filtered at once with suction. The filter residue is washed thoroughly with water and vacuum dried, affording 1 g of the dye of formula (501).

EXAMPLE 6

Dye of the formula

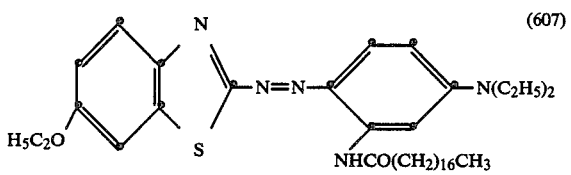

(607)

With stirring, a solution of 0.28 g of sodium nitrite in 1.5 ml of water is added at −10° C. to a solution of 0.78 g of 2-amino-6-ethoxybenzthiazole in a mixture of 1 ml of acetic acid, 5 ml of concentrated sulfuric acid and 2 ml of water. The temperature is then slowly allowed to rise to 20° C. and this diazo solution is added to a solution of 1.7 g of N,N-diethyl-3-stearoylaminoaniline. The mixture is allowed to react for 2 hours at room temperature, then diluted with water and the precipitated dye is collected by filtration. The precipitate is dried and purified by chromatography over silica gel (eluant: 19:1 mixture of toluene/acetone), affording 0.55 g of the dye of formula (607).

EXAMPLE 7

Dye of the formula

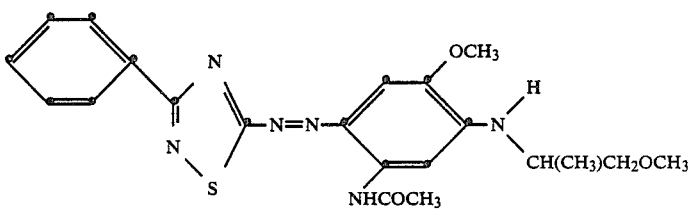

(802)

With stirring, a solution of 0.17 g of sodium nitrite in 1.5 ml of water is added at about 10° C. to a solution of 0.88 g of 5-amino-3-phenyl-1,2,4-thiadiazole in 10 ml of 85% formic acid and the mixture is allowed to react for about 30 minutes. The reaction mixture is then cooled, filtered, and the filter residue is added to a solution of 1.3 g of 5-acetylamino-2-methoxy-N-(2′-methoxyisopropyl)aniline in a mixture of 20 ml of methanol and 4 ml of acetic acid. After 5 hours at 40° C., the batch is concentrated by evaporation in vacuo and the residue is chromatographed over silica gel (eluant: 15:5 mixture of toluene/ethyl acetate), affording 0.05 g of the dye of formula (802).

EXAMPLE 8

Dye of the formula

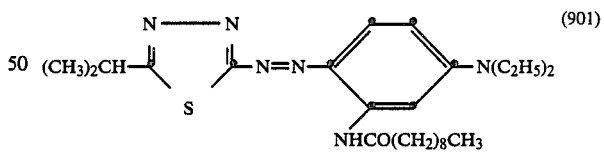

(901)

With efficient stirring, 0.24 g of finely powdered sodium nitrite is added at −10° C., in small portions, to a solution of 0.5 g of 2-amino-5-isopropyl-1,3,4-thiadiazole in 30 ml of concentrated phosphoric acid. The mixture is stirred for 5 minutes and the resultant solution is added to a solution of 0.9 g of N,N-diethyl-3-decanoylaminoaniline in 20 ml of acetic acid. The batch is kept for 1 hour at 0° C., diluted with water and extracted with methylene chloride. The extract is concentrated by evaporation and the residue is purified by chromatography over silica gel, affording 0.15 g of the dye of formula (901).

The dyes listed in the following Table 1 to 9 are prepared in similar manner.

TABLE 1

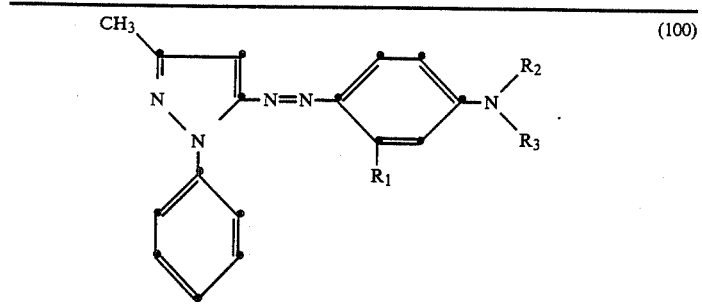

(100)

| compound of formula | R₁ | R₂ | R₃ | $\lambda_{max}$ (nm) (chloroform) |
|---|---|---|---|---|
| 101 | CH₃ | CH₃ | CH₃ | 449 |
| 102 | H | n-C₃H₇ | n-C₃H₇ | 470 |
| 103 | H | (CH₂)₃NHCOC(CH₃)₃ | (CH₂)₃NHCOC(CH₃)₃ | 450 |
| 104 | H | (CH₂)₃NHCO—(CH₂)₆CH₃ | (CH₂)₃NHCO—(CH₂)₆CH₃ | 445 |
| 105 | H | (CH₂)₃NHCO—(CH₂)₁₀CH₃ | (CH₂)₃NHCO—(CH₂)₁₀CH₃ | 450 |

TABLE 2

(200)

| compound of formula | R₁ | R₂ | R₃ | A | $\lambda_{max}$ (nm) (chloroform) |
|---|---|---|---|---|---|
| 201 | H | CH₃ | CH₂CH₂—⌬ | H | 422 |
| 202 | NHCO(CH₂)₆CH₃ | C₂H₅ | C₂H₅ | H | 474 |
| 203 | NHCO(CH₂)₈CH₃ | C₂H₅ | C₂H₅ | CH₃ | 540 |

TABLE 3

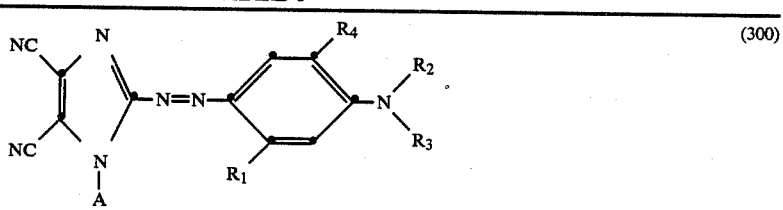

(300)

| compound of formula | A | R₁ | R₄ | R₂ | R₃ | $\lambda_{max}$ (nm) (CHCl₃) |
|---|---|---|---|---|---|---|
| 301 | C₂H₅— | —NHCOCH₃ | H | n-C₆H₁₃ | n-C₆H₁₃ | 531 |
| 302 | CH₃— | —NHCO(CH₂)₁₂CH₃ | H | C₂H₅ | C₂H₅ | 528 |
| 303 | H₅C₂OCH₂CH₂— | —NHCOCH₂CH(CH₃)₂ | H | C₂H₅ | C₂H₅ | 526 |
| 304 | ⌬—OCH₂CH₂— | —NHCOCH₂CH(CH₃)₂ | H | C₂H₅ | C₂H₅ | 528 |

TABLE 3-continued (300)

| compound of formula | A | $R_1$ | $R_4$ | $R_2$ | $R_3$ | $\lambda_{max}$ (nm) (CHCl$_3$) |
|---|---|---|---|---|---|---|
| 305 | [phenyl]—OCH$_2$CH$_2$— | —NHCOCH$_2$CH(CH$_3$)$_2$ | OCH$_3$ | H | CH(CH$_3$)CH$_2$OCH$_3$ | 548 |
| 306 | H$_5$C$_2$OCH$_2$CH$_2$— | —NHCOCH$_2$CH(CH$_3$)$_2$ | OCH$_3$ | H | CH(CH$_3$)CH$_2$OCH$_3$ | 550 |
| 307 | H$_5$C$_2$OOCCH$_2$— | —NHCOCH$_2$CH(CH$_3$)$_2$ | OCH$_3$ | H | CH(CH$_3$)CH$_2$OCH$_3$ | 552 |
| 308 | CH$_3$COCH$_2$— | —NHCOCON(CH$_3$)[phenyl] | OCH$_3$ | H | CH(CH$_3$)CH$_2$OCH$_3$ | 548 |
| 309 | [phenyl]—CH$_2$OOCCH$_2$— | —NHCOCON(CH$_3$)[phenyl] | OCH$_3$ | H | CH(CH$_3$)CH$_2$OCH$_3$ | 551 |
| 310 | NC—CH$_2$— | —NHCOCH$_2$CH(CH$_3$)$_2$ | OCH$_3$ | H | CH(CH$_3$)CH$_2$OCH$_3$ | 562 |
| 311 | (CH$_3$)$_3$CCOOCH$_2$— | —NHCOCH$_2$CH(CH$_3$)$_2$ | OCH$_3$ | H | CH(CH$_3$)CH$_2$OCH$_3$ | 550 |
| 312 | [phenyl]—COCH$_2$— | —NHCOCH$_2$CH(CH$_3$)$_2$ | OCH$_3$ | H | CH(CH$_3$)CH$_2$OCH$_3$ | 549 |
| 313 | CH$_3$COCH$_2$— | —NHCOCH$_2$CH(CH$_3$)$_2$ | OCH$_3$ | H | CH(CH$_3$)CH$_2$OCH$_3$ | 550 |
| 314 | [phenyl]—CH$_2$OOCCH$_2$— | —NHCOCH$_2$CH(CH$_3$)$_2$ | OCH$_3$ | H | CH(CH$_3$)CH$_2$OCH$_3$ | 552 |
| 315 | [phenyl]—CH$_2$OOCCH$_2$— | —NHCOCH$_3$ | OCH$_3$ | H | —CH$_2$—[phenyl] | 553 |
| 316 | H$_5$C$_2$OOCCH$_2$— | —NHCOCH$_3$ | OCH$_3$ | H | —CH$_2$—[phenyl] | 551 |
| 317 | H$_5$C$_2$OCH$_2$CH$_2$— | —NHCOCH$_2$CH(CH$_3$)$_2$ | OCH$_3$ | H | CH(CH$_3$)CH$_2$OCH$_3$ | 545 |
| 318 | H$_5$C$_2$OCH$_2$CH$_2$— | —NHCOCH$_3$ | OCH$_3$ | H | CH(CH$_3$)CH$_2$OCH$_3$ | 545 |
| 319 | [phenyl]—OCH$_2$CH$_2$— | —NHCOCH$_3$ | OCH$_3$ | H | CH(CH$_3$)CH$_2$OCH$_3$ | 547 |
| 320 | H | —NHCOCH$_2$CH(CH$_3$)$_2$ | OCH$_3$ | C$_2$H$_5$ | C$_2$H$_5$ | 568 |

TABLE 4

(400)

| compound of formula | $A_1$ | $A_2$ | $R_1$ | $R_4$ | $R_2$ | $R_3$ | $\lambda_{max}$ (nm) (CHCl$_3$) |
|---|---|---|---|---|---|---|---|
| 401 | H | H | H | H | C$_2$H$_5$ | —CH$_2$—[phenyl] | 480 |

TABLE 4-continued

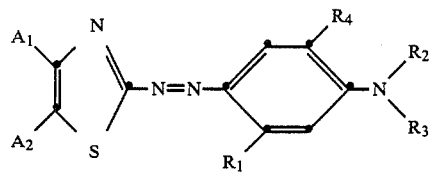
(400)

| compound of formula | A₁ | A₂ | R₁ | R₄ | R₂ | R₃ | $\lambda_{max}$ (nm) (CHCl₃) |
|---|---|---|---|---|---|---|---|
| 402 | H | NO₂ | H | H | C₂H₅ | CH₂—C₆H₅ | 570 |
| 403 | H | NO₂ | H | H | (CH₂)₃NHCOC(CH₃)₃ | (CH₂)₃NHCOC(CH₃)₃ | 566 |
| 404 | O₂N—C₆H₄— | NO₂ | —NHCOCH₃ | OCH₃ | n-C₄H₉ | n-C₄H₉ | 630 |
| 405 | O₂N—C₆H₄— | NO₂ | —NHPO(OC₂H₄OC₂H₅)₂ | OCH₃ | C₂H₅ | C₂H₅ | 622 |

TABLE 5

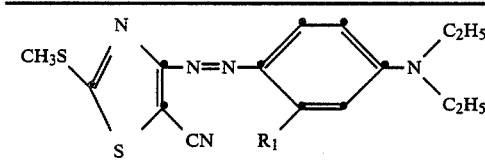
(500)

| compound of formula | R₁ | $\lambda_{max}$ (nm) (chloroform) |
|---|---|---|
| 501 | NHCO—C₇H₁₅ | 538 |
| 502 | NHCO—C₉H₁₉ | 540 |

TABLE 7

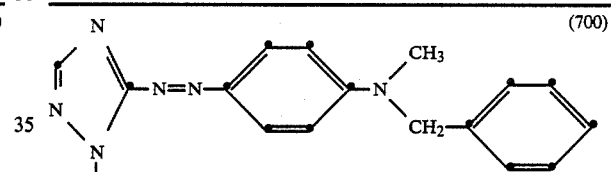
(700)

| compound of formula | A | $\lambda_{max}$ (nm) (chloroform) |
|---|---|---|
| 701 | H | 454 |
| 702 | n-C₁₀H₂₁ | 460 |

TABLE 6

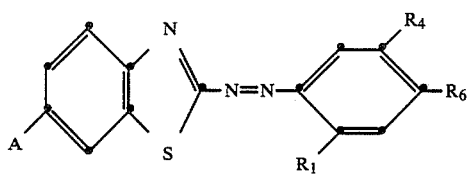
(600)

| compound of formula | A | R₁ | R₄ | R₆ | $\lambda_{max}$ (nm) (chloroform) |
|---|---|---|---|---|---|
| 601 | H | —OH | —OCH₂CH₂O—CH₂CH₂OCH₃ | H | 534 |
| 602 | H | —NHCOCH₂CH(CH₃)₂ | H | —N(CH₃)₂ | 524 |
| 603 | H | —NHCOCH₂CH(CH₃)₂ | OCH₃ | —N(C₂H₅)₂ | 560 |
| 604 | H₅C₂O | —NHCO(CH₂)₆CH₃ | H | —N(C₂H₅)₂ | 535 |
| 605 | H₂C₂O | —NHCO(CH₂)₁₆CH₃ | H | —N(C₂H₅)₂ | 535 |
| 606 | H₅C₂O | —NHCOCH₂CH(CH₃)₂ | OCH₃ | —N(C₂H₅)₂ | 563 |

TABLE 8

(800)

[Structure: A-C(=N-S-N)-C(=N-N=Ar)... thiadiazole linked via azo to benzene ring with R4, R3, R2, R1 substituents, where benzene has NR2R3 group]

| compound of formula | A | R₁ | R₄ | R₂ | R₃ | $\lambda_{max}$ (nm) (chloroform) |
|---|---|---|---|---|---|---|
| 801 | phenyl | —NHCO(CH₂)₆CH₃ | H | C₂H₅ | C₂H₅ | 530 |
| 802 | phenyl | —NHCOCH₃ | OCH₃ | H | —CH(CH₃)CH₂OCH₃ | 550 |
| 803 | Cl | —NHCO(CH₂)₁₆CH₃ | H | C₂H₅ | C₂H₅ | 536 |
| 804 | Cl | —NHCOCH₂CH(CH₃)₂ | H | n-C₆H₁₃ | n-C₆H₁₃ | 540 |
| 805 | Cl | —NHPO(OC₂H₅)₂ | H | C₂H₅ | C₂H₅ | 527 |
| 806 | Cl | —NHCOCH₂CH(CH₃)₂ | OCH₃ | H | —CH(CH₃)CH₂OCH₃ | 565 |
| 807 | Cl | —NHCOCH₃ | OCH₃ | H | —CH₂-phenyl | 563 |
| 808 | Cl₃C— | —NHCOCH₂CH(CH₃)₂ | H | C₂H₅ | C₂H₅ | 535 |
| 809 | Cl₃C— | —NHCO(CH₂)₆CH₃ | H | C₂H₅ | C₂H₅ | 537 |
| 810 | Cl₃C— | —NHCOCH₂CH(CH₃)₂ | OCH₃ | H | —CH(CH₃)CH₂OCH₃ | 565 |
| 811 | Cl₃C— | —NHCOCH₃ | OCH₃ | H | —CH₂-phenyl | 562 |
| 812 | phenyl-CH₂S— | —NHCOCH₂CH(CH₃)₂ | H | n-C₆H₁₃ | n-C₆H₁₃ | 537 |
| 813 | phenyl-CH₂S— | —NHCOCH₂CH(CH₃)₂ | H | C₂H₅ | C₂H₅ | 531 |
| 814 | phenyl-CH₂S— | —NHCOCH₂CH(CH₃)₂ | OCH₃ | H | CH(CH₃)CH₂OCH₃ | 531 |
| 815 | phenyl-CH₂S— | —NHCOCH₃ | OCH₃ | H | —CH₂-phenyl | 548 |

TABLE 9

(900)

| compound of formula | A | R₁ | R₂ | R₃ | $\lambda_{max}$ (nm) (chloroform) |
|---|---|---|---|---|---|
| 901 | (CH₃)₂CH— | —NHCO(CH₂)₈CH₃ | C₂H₅ | C₂H₅ | 509 |
| 902 | CH₃(CH₂)₁₀— | —NHCO(CH₂)₆CH₃ | C₂H₅ | C₂H₅ | 510 |
| 903 | (phenyl) | H | C₂H₅ | C₂H₄OH | 504 |
| 904 | (phenyl) | —NHCO(CH₂)₆CH₃ | C₂H₅ | C₂H₅ | 530 |

USE EXAMPLE 13.2 mg of the dye of formula (802) is dissolved in 2 ml of a 9:1 mixture of ethyl acetate and tricresyl phosphate, and the solution is added to a mixture of 6.6 ml of a 6% aqueous gelatin solution. 0.9 ml of distilled water and 0.5 ml of an 8% solution of sodium dibutylnaphthalenesulfonate, and emulsified therein by ultrasonics.

2.5 ml of the resultant emulsion are mixed with 5 ml of water, 1.5 ml of gelatin/silver bromide-iodide emulsion containing about 22 g of silver/kg as silver halide and 70 g of gelatin, and 1 ml of a 1% solution of a hardener of the formula

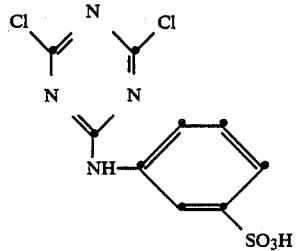

This mixture is coated on an opaque triacetate base (13×18 cm) and dried. The resultant light-sensitive material is exposed behind a step wedge and is processed at 30° C., as follows:

developping—3 minutes
washing—1 minute
silver bleaching and dye bleaching—5 minutes
washing—1 minute
fixing—4 minutes
washing—6 minutes drying—

The developer bath contains the following ingredients per liter of solution:
sodium sulfate—50 g
1-phenyl-3-pyrazolidone—0.2 g
hydroquinone—6 g
sodium carbonate—35 g
potassium bromide—4 g
benzotriazole—0.3 g The silver dye bleach bath contains the following ingredients per liter of solution:
concentrated sulfuric acid—28 ml
sodium m-nitrobenzenesulfonate—10 g
potassium iodide—6 g
sodium salt of bis(2-cyanoethyl)-(2-sulfoethyl)phosphine—3 g
2,3-dimethylquinoxaline—1.5 g The fixing bath contains the following ingredients per liter of solution:
sodium thiosulfate—200 g
sodium metabisulfite—20 g A brilliant, lightfast magenta wedge is obtained, which is bleached completely white in the areas of strongest exposure.

This wedge is irradiated in a Weather-Ometer (available from Atlas) with a 2500 watt xenon arc lamp (total of 21 kJoule/cm²) and the percentage decrease in density is determined at an original density of 1.0.

The dyes of formulae (203), (301), (303), (304), (306), (318), (319), (603) and (805) are cast and tested in analogous manner.

The results are reported in Table 10.

TABLE 10

| compound of formula | Decrease in density in % ($D_o$ = 1.0; 21 kJoule/cm²) |
|---|---|
| 203 | 0 |
| 301 | 2 |
| 303 | 2 |
| 304 | 3 |
| 306 | 4 |
| 318 | 2 |
| 319 | 3 |
| 603 | 4 |
| 802 | 5 |
| 805 | 7 |

The table shows that photographic images of excellent lightfastness can be obtained with the photographic material of this invention that contains the compounds listed therein.

What is claimed is:
1. A compound of the formula

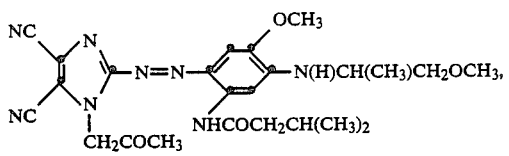
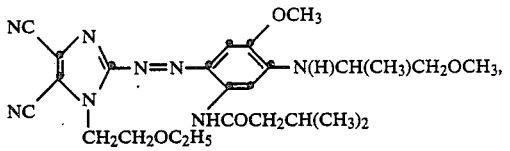
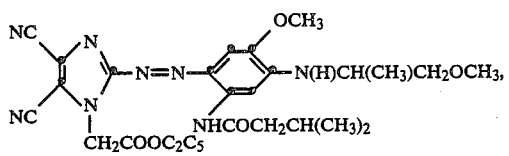
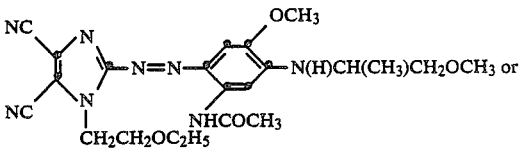
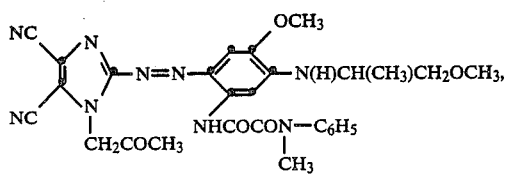
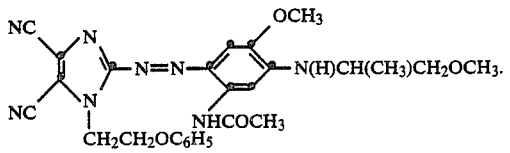
* * * * *